Aug. 6, 1940.    W. WILSON    2,210,697
STRUCTURAL JOINT CONSTRUCTION
Filed Sept. 28, 1938    2 Sheets-Sheet 1
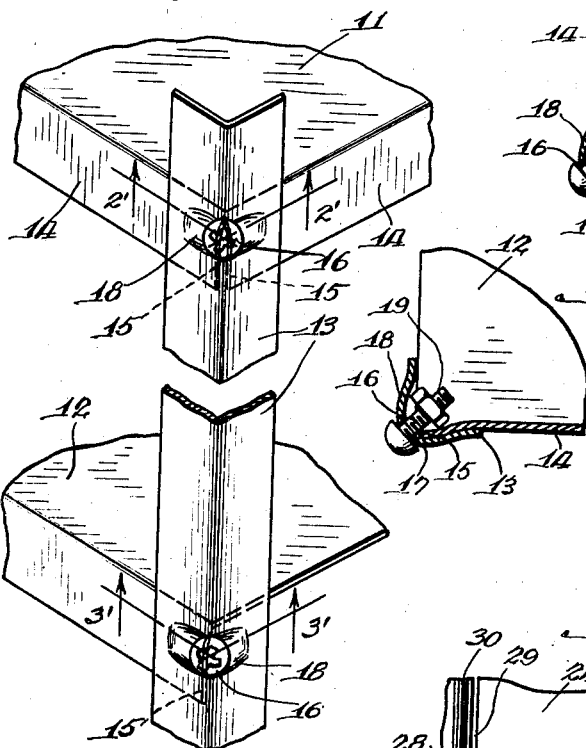
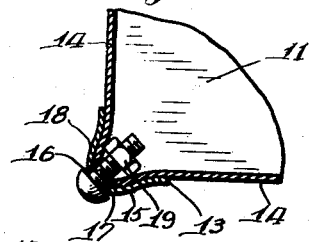
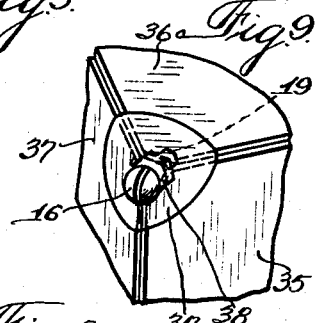
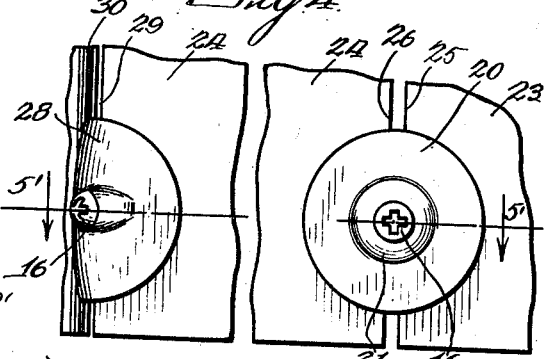
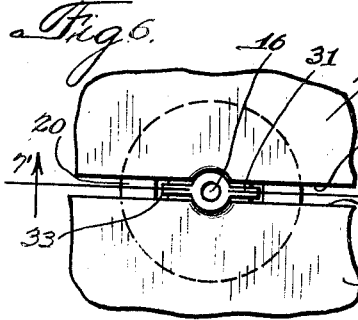
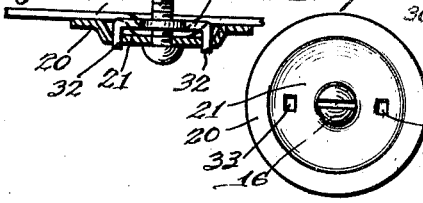
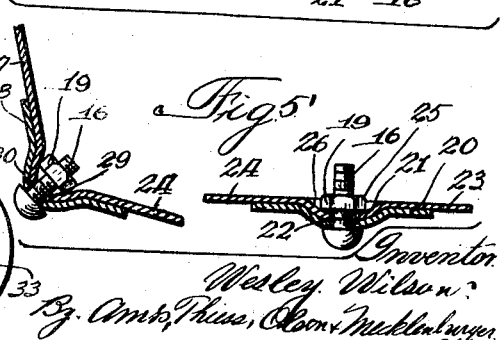

Aug. 6, 1940.                W. WILSON                 2,210,697
                    STRUCTURAL JOINT CONSTRUCTION
                      Filed Sept. 28, 1938       2 Sheets-Sheet 2
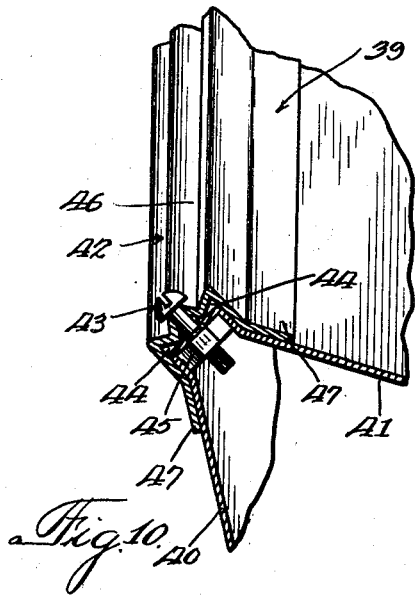
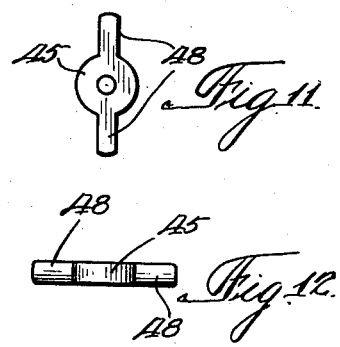
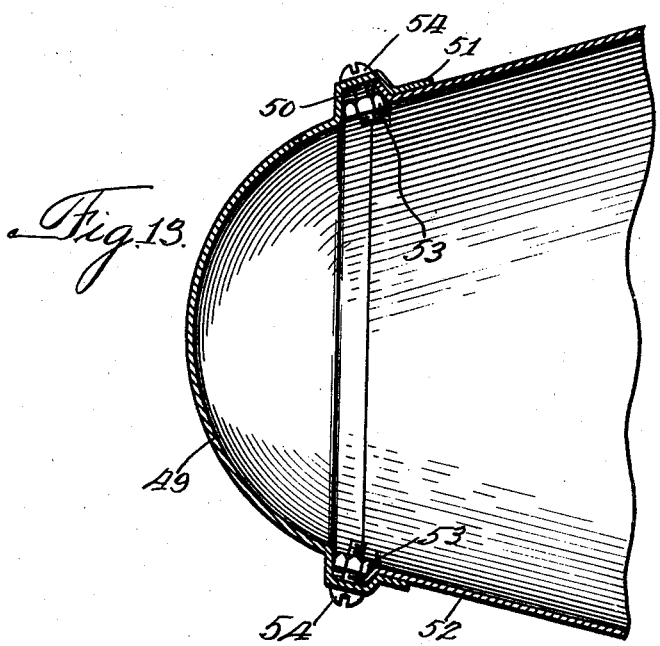

Patented Aug. 6, 1940

2,210,697

UNITED STATES PATENT OFFICE 2,210,697

STRUCTURAL JOINT CONSTRUCTION

Wesley Wilson, Chicago, Ill.

Application September 28, 1938, Serial No. 232,143

6 Claims. (Cl. 189—36)

This invention relates to a structural joint construction and has for an object the provision of improved means for clamping sheet materials together.

In order that a plurality of sheets may be clamped together in accordance with this invention, a recessed member is provided which is adaptable to engage a suitable clamping member whereby the resilient edge of a sheet may be deformed into the recess of said recessed member whereby the recessed member becomes firmly engaged with the edge of the sheet.

In order that a more clear understanding may be had of this invention, reference will be had to the drawings in which:

Figure 1 is a perspective view of a portion of a structure comprising plates secured to an angle iron in accordance with one embodiment of this invention;

Fig. 2 is a cross section taken along the line 2'—2' of Fig. 1;

Fig. 3 is a cross section taken along the line 3'—3' of Fig. 1;

Fig. 4 is a plan view of a structural joint constructed in accordance with one embodiment of this invention wherein is indicated sheets secured together by means of separate clamping means;

Fig. 5 is a cross section taken along the line 5'—5' of Fig. 4;

Fig. 6 is a plan view of a construction similar to a portion of that shown in Fig. 4, wherein a modified form of clamping means is shown;

Fig. 7 is a cross section taken along the line 7'—7' of Fig. 6;

Fig. 8 is a plan view of a recessed member with a bolt inserted therethrough employed with the modified form shown in Fig. 6;

Fig. 9 is a plan view of a joint constructed in accordance with one embodiment of this invention wherein three sheets are secured at their respective corners by single clamping means.

Fig. 10 is a sectional perspective view showing another embodiment of my invention;

Fig. 11 is a plan view of a nut which may be used in the construction shown in Fig. 10 and some of the other constructions;

Fig. 12 is a side elevation of the nut shown in Fig. 11; and

Fig. 13 is an axial sectional view showing my invention in connection with a bowl-like construction such as might be suitable for reflectors or the like.

According to one preferred embodiment, the structural joint of this invention comprises a recessed member such as a disc, plate, or angle iron which may contain a hole within the recess. The hole is positioned to engage a clamping member such as a bolt or screw which is threadably engaged with a nut. The screw is positioned adjacent to the edge of the sheet member which is to be clamped to the recessed member and engaged with the nut whereby an edge of the sheet member is deformed into the recessed portion of the recessed member. The sheet is thereby firmly attached to the recessed member. In a similar fashion a plurality of sheets may be clamped to the recessed member in a manner that will be hereinafter more specifically described.

Referring now more particularly to the drawings, Figs. 1, 2, and 3 show a structural joint wherein two sheet members 11 and 12 are attached to a single angle iron 13 in accordance with one embodiment of this invention. Sheet 11 has downwardly extending flange portions 14 having adjacent edges 15 between which a suitable clamping member such as a screw 16 may be inserted. The screw 16 also passes through a hole 17 positioned in the apex of the angle iron 13 at any desired place. Adjacent to the holes 17 in the angle iron 13 suitable recessed portions 18 are provided which extend away from the edges 15 of the flanges 14 adjacent thereto. The vertically extending edges 15 of the flange portions 14 of the sheet 11 are forced into the recess 18 of the angle iron 13 when a nut 19 is drawn down on screw 16 which may be turned by a suitable screw driver.

Plate 11 is shown in Figs. 1 and 2 as being attached to the angle iron 13 by means of two edges 15 of the two flanges 14 which are bent at right angles to the plane of the plate 11. Plate 12, however, is secured to the angle iron 13 by forcing into the recess 18 the single edge 15 of the single flange 14 extending downwardly and at right angles to the plate 12. The manner in which the latter joint is obtained is designated by the sectional view shown in Fig. 3.

In order that two sheets may be secured together edge to edge in the same plane or at an angle in accordance with one embodiment of this invention, a structure may be provided as indicated in Figs. 4 and 5. In order to secure sheets together which lie in the same plane, the recessed member may comprise a suitable disc 20 having a recess 21 within which may be punched a hole 22 through which a screw 16 may be inserted. The edges of sheets 23 and 24 are positioned adjacent the screw 16 and the nut 19 is turned down on the screw 16 by means of a screw driver or other suitable means whereby the edge portions 25 and 26 of the plates 23 and 24 are deformed into the recess 21 by the pressure of the nut 19 and the plates are securely fastened together thereby. In order to secure two sheets 26 and 27 together at an angle a clamping means may be provided which comprises a metal piece 28 bent at substantially the same angle at which it is desired for the plates to be secured. The edges 29 and 30 of the plates 26 and 27 may be clamped in the same manner that has been hereinabove described. It will be noted by referring to Fig. 5 that as the nut 19 is drawn into the recess 18 the nut will bite into the plates 26 and 27 and draw them into the recess 18 and that this will draw the edges 29 and 30 toward each other to close up the gap between them.

It will be observed that the nut 19 is substantially prevented from turning during the clamping operation since the edges of the nut are firmly abutted against the edges of the sheets which are forced into the recesses. It may be desirable, however, as shown in Figs. 6, 7 and 8, to provide a nut having winged portions 31 and inwardly extending flanges 32 which may extend between the edges of the plates 23 and 24 and into holes 33 of the recessed portion 21 of disc 20 whereby the rotation of the nut is prevented during the tightening of the screw 16.

In order to fasten three plates together in accordance with this invention, a recessed member 34 may be provided into which three corners of sheets 35, 36 and 37 may be inserted, as shown in Fig. 9. In the particular embodiment shown the three corners are each engaged by the nut 19 and deformed into and held securely in the recess 38 of the recessed member 34.

Fig. 10 shows a construction in which a special angle strip 39 is provided for securing together two flat sheet metal pieces 40 and 41. This angle strip has a channel portion having a corrugated portion 42 having openings through which the clamping screws 43 are inserted and shaped to provide longitudinally-extending recesses 44 into which the edges of the sheet metal pieces may be forced by the nut 45 when the screw 43 is tightened. Undeformed edge portions of the sheet metal pieces may rest in the central corrugation 46 to prevent the nut 45 from forcing the sheet metal pieces away from the flanges 47 on the angle strip as the screw is tightened to cause the nut to force the edges of the sheet metal pieces into the recessed portion of the angle strip. In order to prevent the nut from turning as the screw is tightened, it may be provided with wing portions 48 as shown in Figs. 11 and 12 which will engage the sides of the sheet metal pieces as the screw 43 is turned.

The construction shown in Fig. 13 comprises a cup-like portion 49 which may be of sheet metal or cast metal having an annular peripheral groove 50, an annular peripheral flange 51, and an annular sheet metal portion 52 having an annular edge, portions of which may be deformed by the clamping nuts 53 as the clamping screws 54 are tightened to draw portions of the annular peripheral edge of the member 52 into the annular recess or groove 50 in the cup-like member 49.

While several particular embodiments of this invention are shown above, it will be understood, of course, that the invention is not to be limited thereto since many modifications may be made, and it is contemplated, therefore, to cover any such modifications as fall within the true spirit and scope of this invention as defined by the appended claims.

I claim:

1. A structural joint construction comprising a member having a pocket, said pocket having a hole therein, a screw swiveled in said hole having an operating head on the opposite side of said member from said pocket, said head having a swivel thrust engagement with said member and a nut having threaded engagement with said screw and having a small portion adjacent said screw for bearing on a deformable edge portion of the sheet metal member and forcing only that part of said edge portion adjacent said screw into said pocket.

2. A structural joint construction comprising a member having a pocket, said pocket having a hole therein, a screw-threaded tension member extending through said hole, a sheet metal member having a deformable edge portion adjacent said tension member but not surrounding the tension member, and a clamping member having a threaded engagement with said tension member and cooperating with said tension member to deform only that part of said edge portion adjacent the tension member and force it into said pocket.

3. A structural joint construction comprising a member having a pocket, said pocket having a hole therein, a screw swiveled in said hole and having an operating head outside said pocket, a sheet metal member having a deformable edge portion adjacent but not surrounding the shank of said screw and a nut threaded on said screw for bearing on said deformable edge portion and forcing only that part of said edge portion adjacent the shank of the screw into said pocket.

4. A structural joint comprising a member having a pocket, said pocket having a hole therein, a locking member passing through said hole, said locking member having a shank portion at the point where it passes through said hole, a sheet metal member having a deformable edge portion adjacent but not surrounding the shank of said locking member, and a projecting portion on said locking member for engaging said deformable edge portion and forcing only that part of said edge portion adjacent the shank of said locking member into said pocket.

5. A structural joint comprising a member having a pocket, said pocket having a hole therein, a screw swiveled in said hole, a sheet metal member having a deformable edge portion adjacent but not surrounding the shank of said screw, a locking nut member threaded on said screw for bearing only on that part of the deformable edge portion adjacent said screw so that when said screw and nut are tightened, said part of said deformable edge portion is forced into said pocket.

6. A structural joint construction comprising a member having a pocket, said pocket having an opening therein, a clamping member having a shank passing through said opening, a sheet metal member having a deformable edge portion adjacent but not surrounding said shank, said clamping member having projecting portions engaging only that part of said deformable edge portion adjacent said shank and means for causing said projecting portion to force and hold said part of said edge portion into said pocket.

WESLEY WILSON.